(12) United States Patent
Higano et al.

(10) Patent No.: US 10,816,857 B2
(45) Date of Patent: Oct. 27, 2020

(54) DISPLAY DEVICE

(71) Applicant: Japan Display Inc., Minato-ku (JP)

(72) Inventors: Emi Higano, Tokyo (JP); Toshiyuki Higano, Tokyo (JP); Shigesumi Araki, Tokyo (JP)

(73) Assignee: Japan Display Inc., Minato-ku (JP)

( * ) Notice: Subject to any disclaimer, the term of this patent is extended or adjusted under 35 U.S.C. 154(b) by 36 days.

(21) Appl. No.: 15/937,969

(22) Filed: Mar. 28, 2018

(65) Prior Publication Data

US 2018/0284515 A1    Oct. 4, 2018

(30) Foreign Application Priority Data

Mar. 28, 2017 (JP) ................. 2017-063058

(51) Int. Cl.
*G02F 1/1339* (2006.01)
*G02F 1/1362* (2006.01)
*G02F 1/1333* (2006.01)

(52) U.S. Cl.
CPC .... *G02F 1/13394* (2013.01); *G02F 1/133305* (2013.01); *G02F 1/133371* (2013.01); *G02F 1/136286* (2013.01); *G02F 2001/13396* (2013.01)

(58) Field of Classification Search
CPC combination set(s) only.
See application file for complete search history.

(56) References Cited

U.S. PATENT DOCUMENTS

| | | | |
|---|---|---|---|
| 6,538,713 B1 | 3/2003 | Yanagawa et al. | |
| 9,829,753 B2 | 11/2017 | Araki et al. | |
| 2008/0198317 A1* | 8/2008 | Tseng | G02F 1/13394 349/138 |
| 2009/0147208 A1* | 6/2009 | Tatemori | G02F 1/13394 349/156 |
| 2009/0244456 A1 | 10/2009 | Miyazaki et al. | |
| 2010/0225875 A1* | 9/2010 | Wang | G02F 1/1339 349/160 |
| 2013/0155367 A1* | 6/2013 | Tomioka | G02F 1/13394 349/155 |
| 2013/0235294 A1* | 9/2013 | Nomura | G02F 1/133345 349/43 |

(Continued)

FOREIGN PATENT DOCUMENTS

| | | |
|---|---|---|
| JP | 2000-305097 | 11/2000 |
| JP | 2004-361807 | 12/2004 |

(Continued)

*Primary Examiner* — Sang V Nguyen
(74) *Attorney, Agent, or Firm* — Oblon, McClelland, Maier & Neustadt, L.L.P.

(57) ABSTRACT

According to one embodiment, a display device comprises first and second flexible substrates, a sealant, a liquid crystal layer, a film, a first protrusion, scan signal lines, and video signal lines. The first flexible substrate includes first and second surfaces. The second flexible substrate includes third and fourth surfaces. The film is disposed on the fourth surface. The first protrusion is disposed on one of first and third surfaces. The scan signal lines extend in a first direction. The video signal lines extend in a second direction. The first protrusion overlaps one of the scan signal lines and the video signal lines, and extends in one of first and second 0directions.

11 Claims, 14 Drawing Sheets

(56) References Cited

U.S. PATENT DOCUMENTS

| | | | |
|---|---|---|---|
| 2015/0029432 A1* | 1/2015 | Ishikawa | G02F 1/13394 349/43 |
| 2015/0098048 A1* | 4/2015 | Tomioka | G02F 1/133512 349/106 |
| 2016/0202543 A1* | 7/2016 | Park | G02F 1/136209 349/42 |
| 2017/0059915 A1* | 3/2017 | Kobayashi | G02F 1/13394 |
| 2017/0108740 A1* | 4/2017 | Kim | G02F 1/1341 |
| 2017/0115525 A1* | 4/2017 | Okita | G02F 1/133345 |
| 2017/0176802 A1* | 6/2017 | Higano | G02F 1/1339 |
| 2017/0274403 A1* | 9/2017 | Miki | F01D 25/00 |
| 2018/0348555 A1* | 12/2018 | Okita | G02F 1/1339 |

FOREIGN PATENT DOCUMENTS

| | | |
|---|---|---|
| JP | 2009-230072 | 10/2009 |
| JP | 2013-140247 | 7/2013 |
| JP | 2015-215483 | 12/2015 |
| JP | 2016-177080 | 10/2016 |

\* cited by examiner

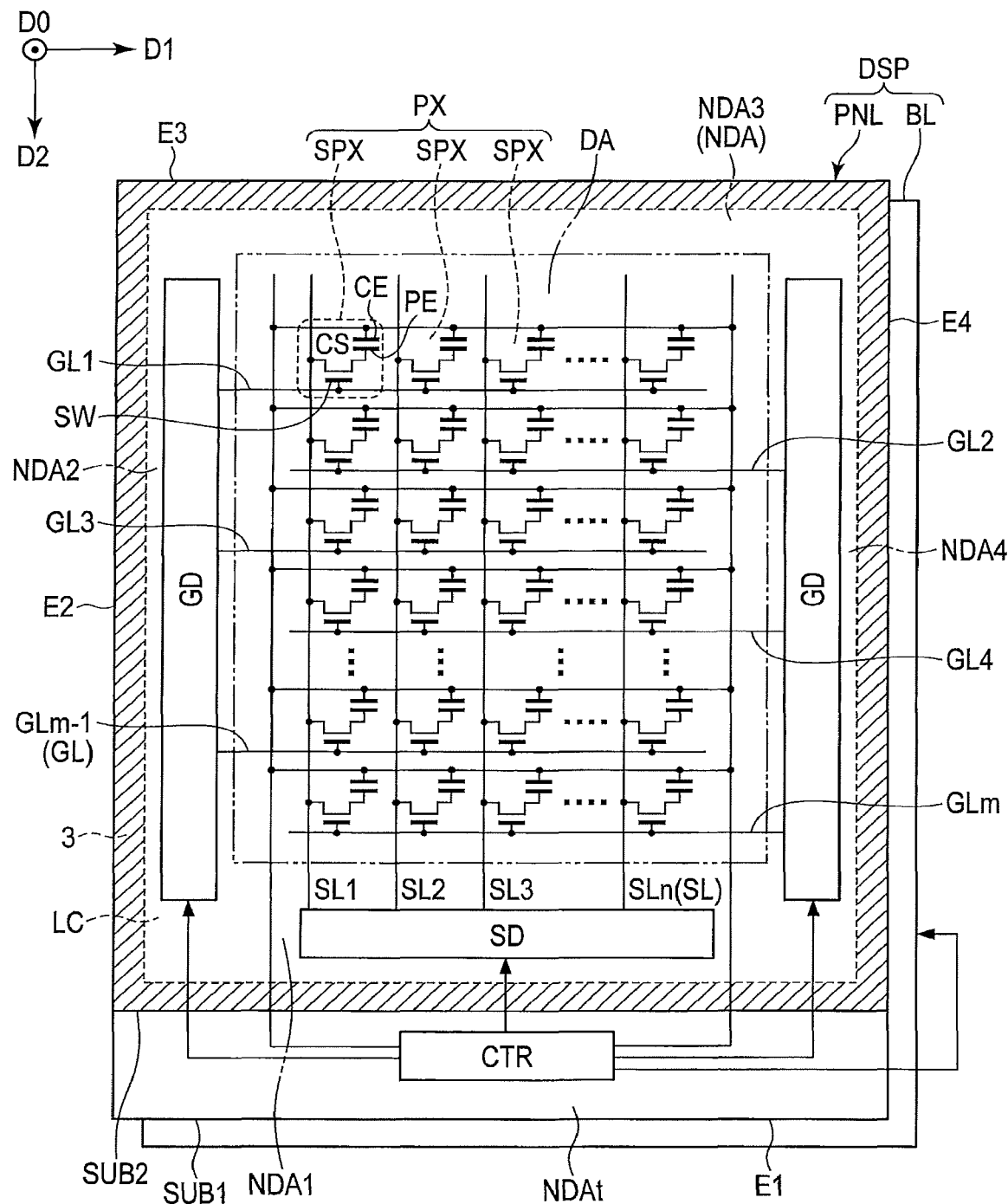
F I G. 1

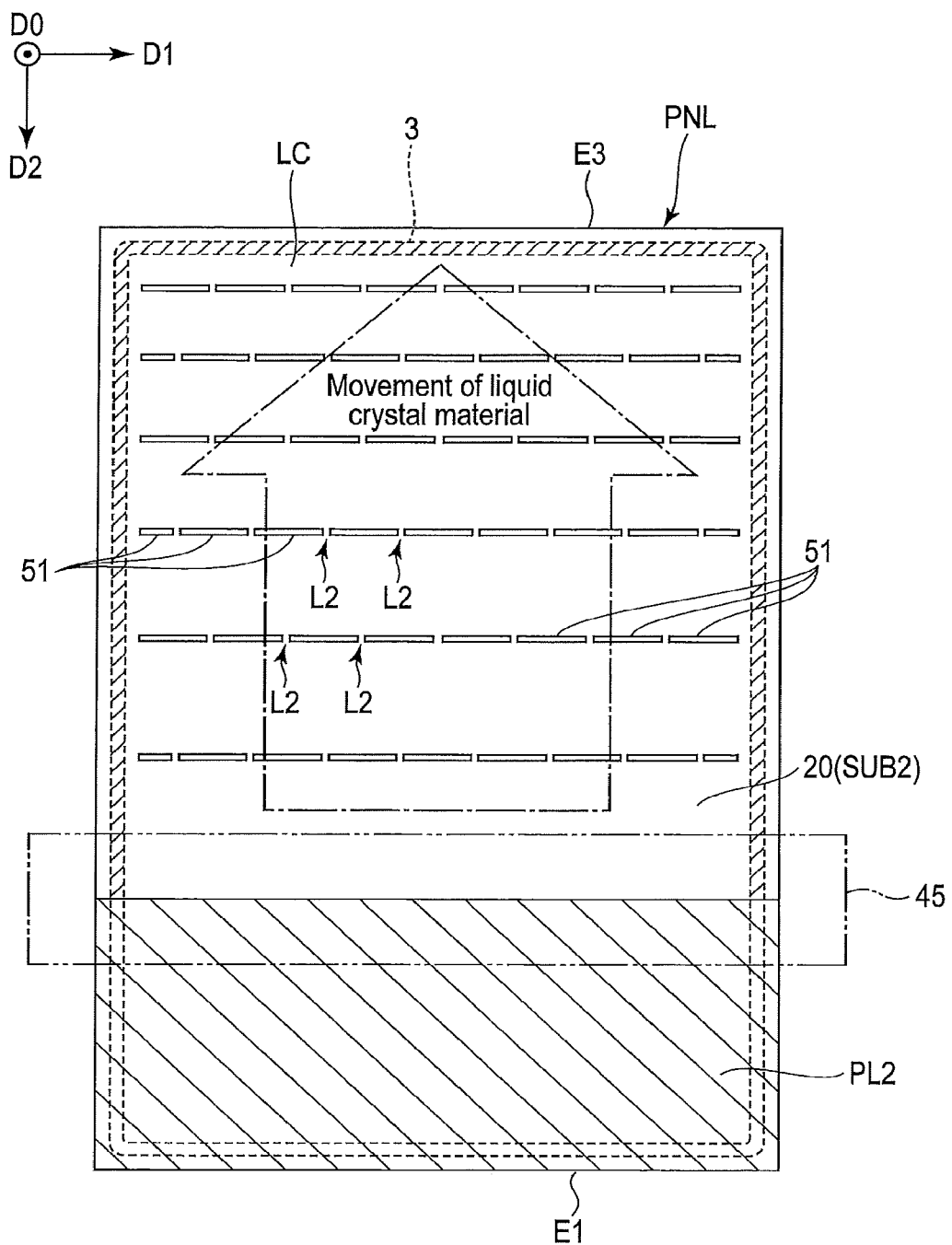
F I G. 5

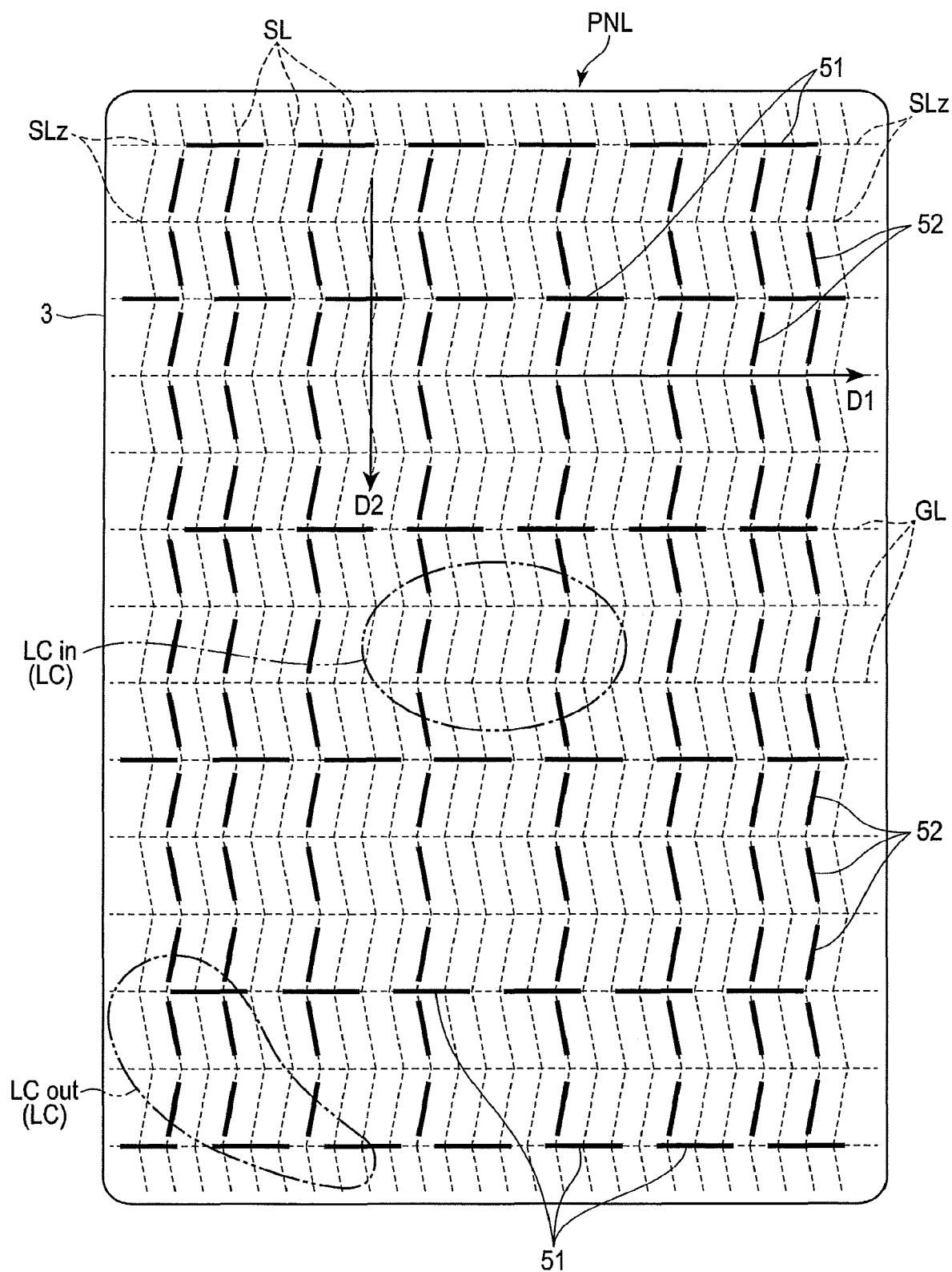
F I G. 8A

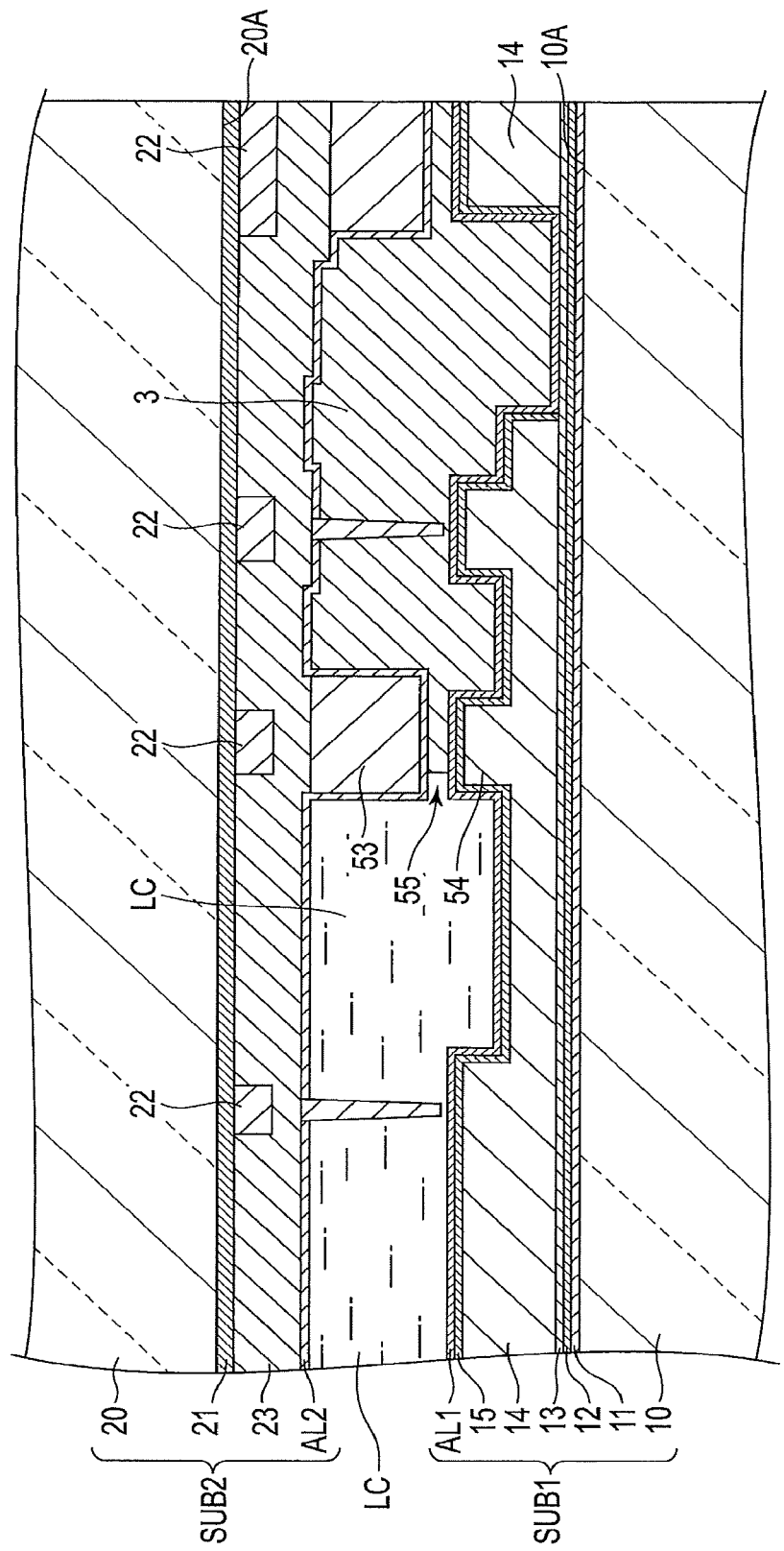
F I G. 9

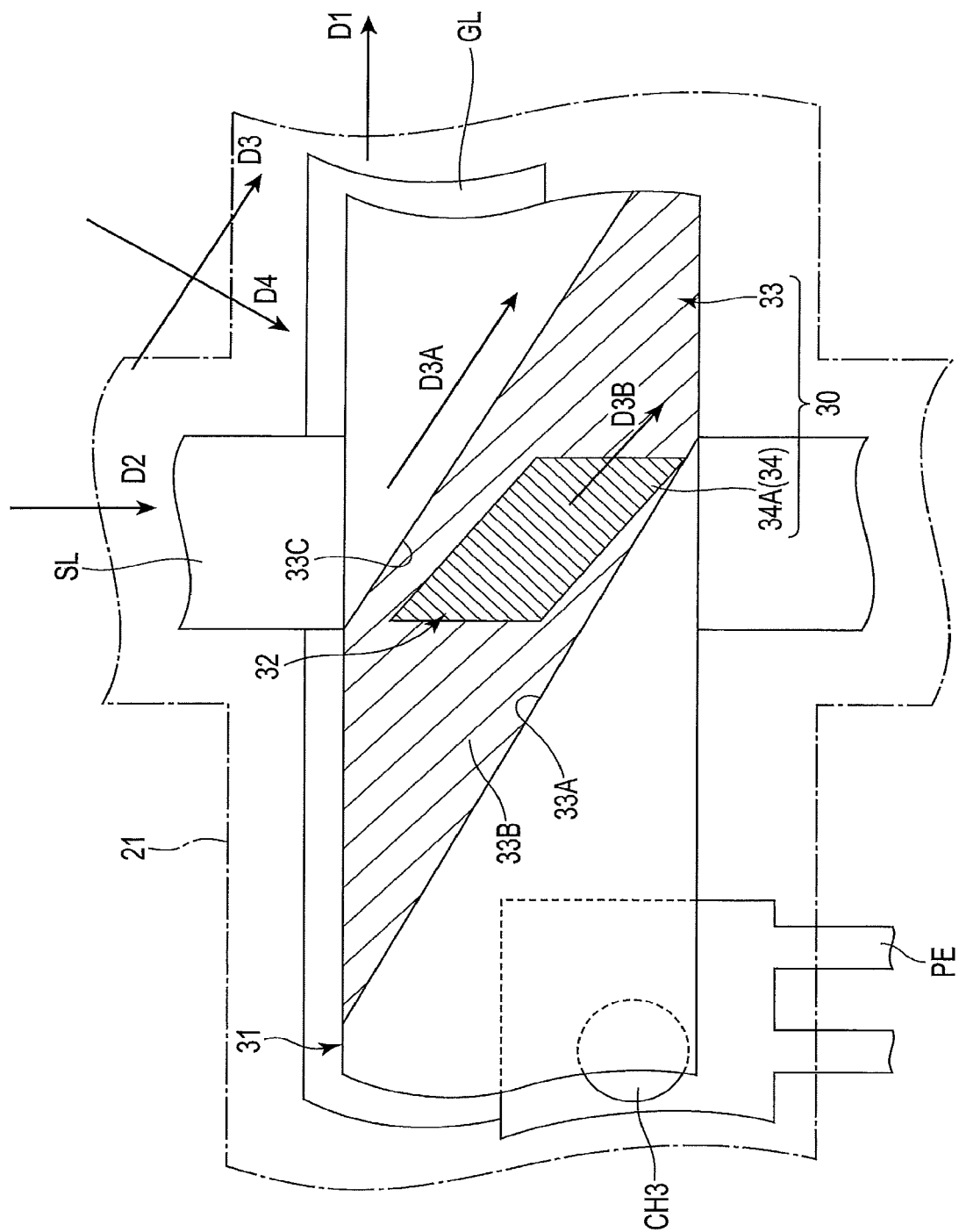
F I G. 11

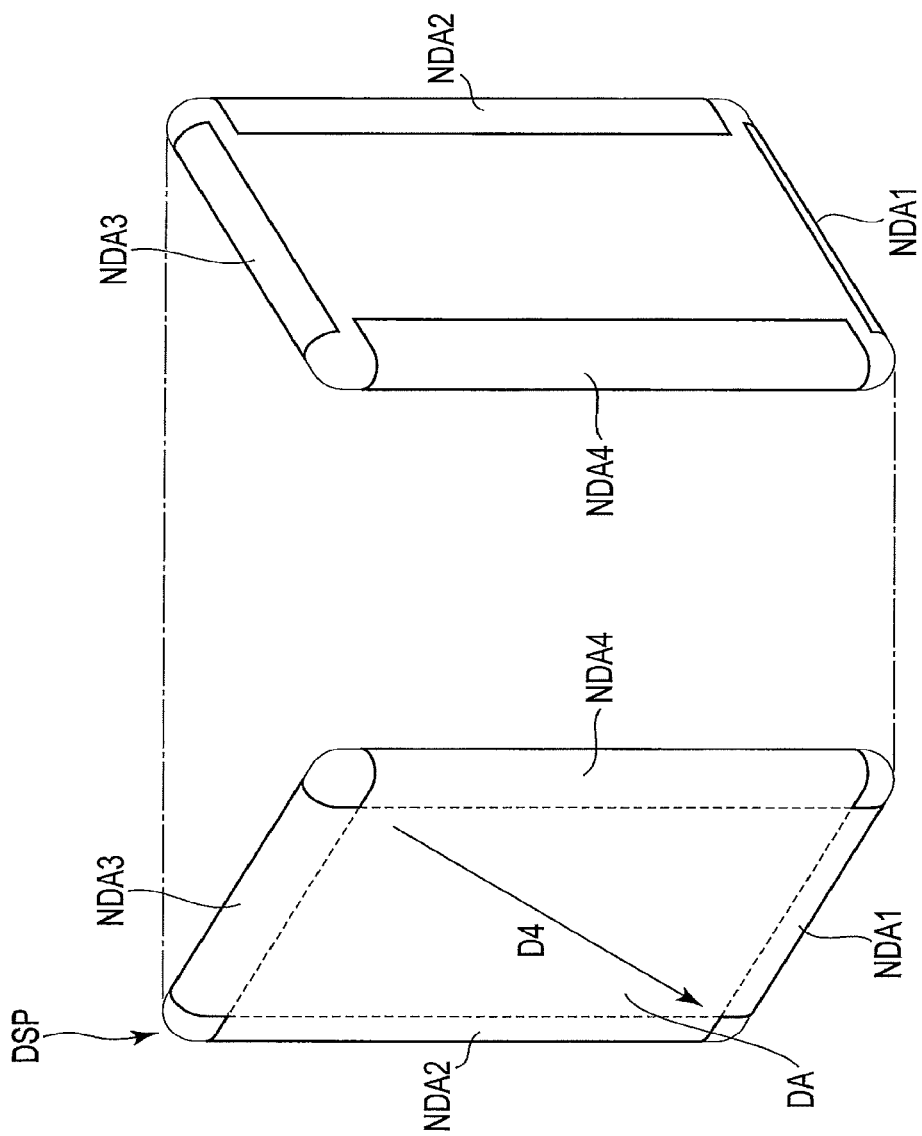
F I G. 12

DISPLAY DEVICE

CROSS-REFERENCE TO RELATED APPLICATIONS

This application is based upon and claims the benefit of priority from Japanese Patent Application No. 2017-063058, filed Mar. 28, 2017, the entire contents of which are incorporated herein by reference.

FIELD

Embodiments described herein relate generally to a flexible liquid crystal display device.

BACKGROUND

Liquid crystal display devices include a pair of substrates adhered by a sealant and a liquid crystal material sealed between the substrates. The flexible liquid crystal display device includes the substrates which are formed of a flexible material. If some power is added to the flexible material substrate, the liquid crystal material moves rapidly, and thus, the sealant surrounding the liquid crystal material may be damaged.

For example, when the flexible substrates are pressed by a roller to attach an optical element film like a polarizer, the flexible substrates are deformed with a weak force as compared to a rigid material such as a glass substrate. In the flexible display device, the movement of the liquid crystal material toward the sealant is increased by the deformation of the flexible substrates.

The present application provides a display device which can suppress such damage to a sealant.

BRIEF DESCRIPTION OF THE DRAWINGS

FIG. 1 is a plan view of a schematic structure of a display device common to the embodiments.

FIG. 5 is a plan view of a process of adhesion of a film of FIG. 4.

FIG. 8A is a plan view schematically showing arrangement density of first and second protrusions.

FIG. 9 is a cross-sectional view of a cross-sectional structure of a non-display area of a display device of a second embodiment.

FIG. 11 is a plan view showing the stopper of FIG. 10 in an enlarged manner.

FIG. 12 is a perspective view of the display device with a curved non-display area.

DETAILED DESCRIPTION

Figure 2:
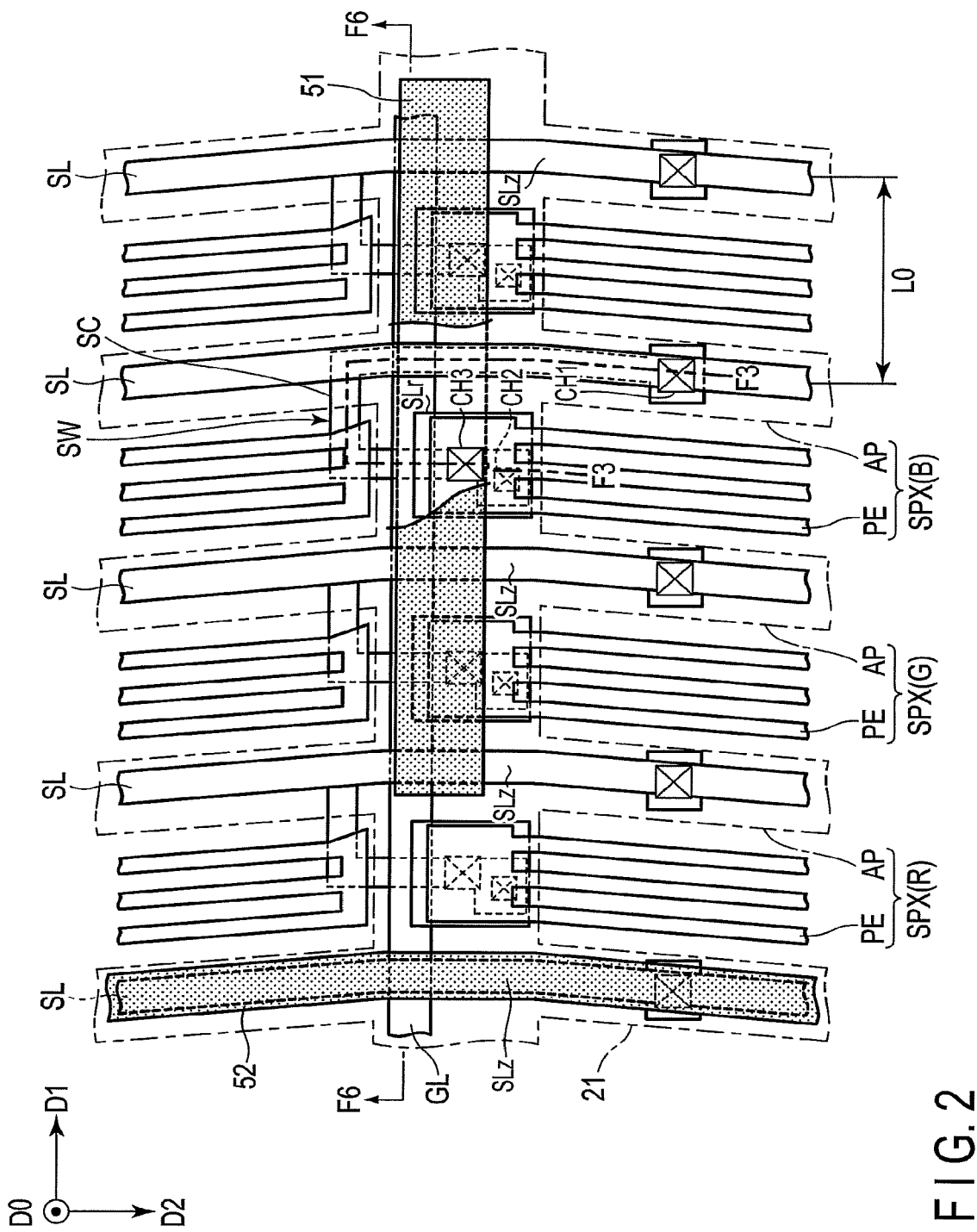
FIG. 2 is a plan view of a subpixel of FIG. 1 in an enlarged manner.

In general, according to one embodiment, a display device comprises a first flexible substrate, a second flexible substrate, a sealant, a liquid crystal layer, a film, a first protrusion, a plurality of scan signal lines, and a plurality of video signal lines. The first flexible substrate includes a first surface and a second surface opposite to the first surface. The second flexible substrate includes a third surface opposite to the first surface and a fourth surface opposite to the third surface. The sealant adheres the first surface and the third surface. The liquid crystal layer is disposed between the first surface and the third surface. The film is disposed on the fourth surface. The first protrusion is disposed on one of the first surface and the third surface. The plurality of scan signal lines extend in a first direction. The plurality of video signal lines extend in a second direction crossing the first direction. The first protrusion overlaps one of the scan signal lines and the video signal lines, and extends in one of the first direction and the second direction in a plan view.

Embodiments will be described hereinafter with reference to the accompanying drawings. Incidentally, the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, and the like of the respective parts are schematically illustrated in the drawings, compared to the actual modes. However, the schematic illustration is merely an example, and adds no restrictions to the interpretation of the invention. Besides, in the specification and drawings, the structural elements having functions, which are identical or similar to the functions of the structural elements described in connection with preceding drawings, are denoted by like reference numerals, and an overlapping detailed description is omitted unless otherwise necessary.

In this specification, the expressions "α includes A, B or C", "α includes one of A, B and C" and "α includes one selected from the group consisting of A, B and C" does not exclude a case where α includes a plurality of combinations of A to C unless otherwise specified. Further, these expressions do not exclude a case where α includes other elements.

In the following description, the display device is a liquid crystal display device DSP. The display device DSP may be used for a smartphone tablet terminal, mobile phone, personal computer, television, car-equipped device, gaming device, wearable device, and the like.

FIG. 1 is a plan view of a schematic structure of the display device DSP commonly applied to the embodiments. As shown in FIG. 1, the display device DSP includes a display panel (liquid crystal cell) PNL including a display surface and a rear surface and an illumination device (backlight) BL which irradiates light onto the rear surface of the display panel PNL.

The display panel PNL displays an image on a display surface by selectively passing the light incident on the rear surface. The display surface of the display panel PNL may be a flat surface or a curved surface. Note that the display panel PNL may be a reflective type display panel which displays an image on a display surface by selectively reflecting the light incident on the display surface of the display panel PNL. If the display panel PNL is of reflective type, the illumination device BL may be omitted. In the following description, viewing the display panel PNL from its display surface to its rear surface is defined as a plan view.

The display panel PNL includes a first substrate (array substrate) SUB1, second substrate (counter substrate) SUB2, sealant 3, liquid crystal layer LC, and control module CTR. The first substrate SUB1 includes first to fourth sides E1, E2, E3, and E4. For example, the first and third sides E1 and E3 are short sides and the second and fourth sides E2 and E4 are long sides.

The second substrate SUB2 is opposed to the first substrate SUB1 in a thickness direction D0 of the display panel PNL. The first substrate SUB1 is formed to be greater than the second substrate SUB2 in, for example, a longitudinal direction of the display panel PNL and includes a terminal area NDAt exposed from the second substrate SUB2. The control module CTR is provided with the terminal area NDAt. Note that the control module CTR may be provided with an external circuit board connected to the terminal area NDAt.

The sealant 3 is formed of an organic material such as acrylic resin or epoxy resin. The sealant 3 corresponds to a hatched part in FIG. 1 and adheres the first substrate SUB1 and the second substrate SUB2 together. The liquid crystal layer LC is disposed between the first substrate SUB1 and the second substrate SUB2 in an inner position than is the sealant 3.

The display panel PNL includes, in a plan view, a display area DA for image display and a non-display area (bezel area) NDA surrounding the display area DA. The display area DA includes a plurality of subpixels SPX in an m×n matrix. For example, a color display pixel PX including three subpixels SPX corresponding red (R), green (G), and blue (B) can be formed. Note that the pixel PX may include a subpixel SPX of different color such as white and may include some subpixels SPX of same color.

The non-display area NDA includes first to fourth non-display areas NDA1, NDA2, NDA3, and NDA4. The non-display area NDA1 is disposed between the display area DA and the first side E1. Similarly, the second non-display area NDA2 is disposed between the display area DA and the second side E2. The third non-display area NDA3 is disposed between the display area DA and the third side E3. The fourth non-display area NDA4 is disposed between the display area DA and the fourth side E4. The first non-display area NDA1 includes the terminal area NDAt.

The first substrate SUB1 includes, in the display area DA, a plurality of scan signal lines GL (GL1, GL2, GL3, . . . GLm+1) and a plurality of video signal lines SL (SL1, SL2, SL3, . . . SLn+1) crossing the scan signal lines GL. The subpixel SPX corresponds to an area defined by two adjacent scan signal lines GL and two adjacent video signal lines SL.

A direction to which the scan signal lines GL extend is defined as first direction D1 and a direction to which the video signal lines SL extend is defined as second direction D2. Note that, in the example of FIG. 1, the video signal lines SL are depicted as straight lines parallel to the second direction D2; however, the video signal lines SL may bend in a zigzag manner and extend in the second direction D2 as in the example of FIG. 8A. Although this is not shown, the video signal lines SL may be curved lines meandering about the second direction D2. Similarly, the scan signal lines GL extending in the first direction D1 may bend or meander.

In the example of FIG. 1, the first direction D1 matches the short side direction of the display panel PNL and the second direction D2 matches the long side direction of the display panel PNL. Note that the first and second directions D1 and D2 are not limited to the example of FIG. 1. The first direction D1 may match the long side direction of the display panel PNL and the second direction D2 may match the short side of the display panel PNL, or they may match the different directions. The first and second directions D1 and D2 extend along the display surface of the display panel PNL and are orthogonal to the thickness direction D0 of the display panel PNL.

The first substrate SUB1 includes a scan driver GD connected to the scan signal lines GL and a video driver SD connected to the video signal lines SL. The scan driver GD is provided with, for example, the second and fourth non-display areas NDA2 and NDA4. The video driver SD is provided with, for example, the first non-display area NDA1 in an inner position than is the terminal area NDAt. Note that the scan driver GD and the video driver SD may be provided with the control module CTR, or may be provided with an external circuit board connected to the display panel PNL.

The first substrate SUB1 includes, in each subpixel SPX, a switching element SW and a pixel electrode PE. The switching element SW is formed of, for example, a thin film transistor (TFT) and is electrically connected to a scan signal line GL, video signal line SL, and pixel electrode PE. A common electrode CE extends to be opposed to the subpixels SPX. The common electrode CE may be provided with the first substrate SUB1 or with the second substrate SUB2.

The control module CTR controls the scan driver GD and the video driver SD. The scan driver GD supplies a scan signal to the scan signal lines GL, and the video driver SD supplies a video signal to the video signal lines SL. When the scan signal is supplied to the scan signal line GL corresponding to the switching element SW, the video signal line SL corresponding to the switching element SW and the pixel electrode PE are electrically connected, and the video signal of the video signal line SL is supplied to the pixel electrode PE. The pixel electrode PE forms a field with the common electrode CE to change the orientation of the liquid crystal molecules of the liquid crystal layer LC. Capacitance CS is formed between the common electrode Ce and the pixel electrode PE, for example.

FIG. 2 is a plan view showing the structure of the subpixel SPX of FIG. 1. As shown in FIG. 2, the switching element SW includes a semiconductor layer SC and a relay electrode SLr. The semiconductor layer SC contacts the video signal line SL in a first contact hole CH1 and contacts the relay electrode SLr in a second contact hole CH2.

The semiconductor layer SC extends from the first contact hole CH1 to the scan signal line GL overlapping the video signal line SL, crosses the scan signal line GL, and then, bends in a U-letter shape to extend in the second contact hole CH2. The relay electrode SLr contacts the pixel electrode PE in a third contact hole CH3. In this example, the switching element SW is of double gate type in which the semiconductor layer SC crosses the scan signal lien GL twice; however, the switching element may be of single gate type.

The area depicted with a single-dotted line in FIG. 2 corresponds to a light shielding layer 21 which shields the light. The light shielding layer 21 includes apertures AP in the subpixels SPX. The pixel electrode PE extends in the aperture AP. The light shielding layer 21 overlaps, in a plan view, the scan signal line GL, video signal line SL, relay electrode SLr, and semiconductor layer SC. The light shielding layer 21 formed along the scan signal line GL covers the relay electrode SLr and the semiconductor layer SC in addition to the scan signal line GL.

On the other hand, the light shielding layer 21 formed along the video signal line SL covers the video signal line SL alone. Here, the video signal line SL is thinner than the scan signal line GL. Thus, the light shielding layer 21 formed along the video signal line SL is narrower than the light shielding layer 21 formed along the scan signal line GL.

In the example of FIG. 2, the video signal line SL includes a plurality of bending parts SLz and extends in the second direction D2 bending in a zigzag manner. Each pixel electrode PE extends parallel to the video signal line SL from one bending part SLz to next bending part SLz. The display device DSP of each embodiment further includes first and second protrusions 51 and 52. The first and second protrusions 51 and 52 will be explained later with reference to FIGS. 6A to 8B.

Figure 3:
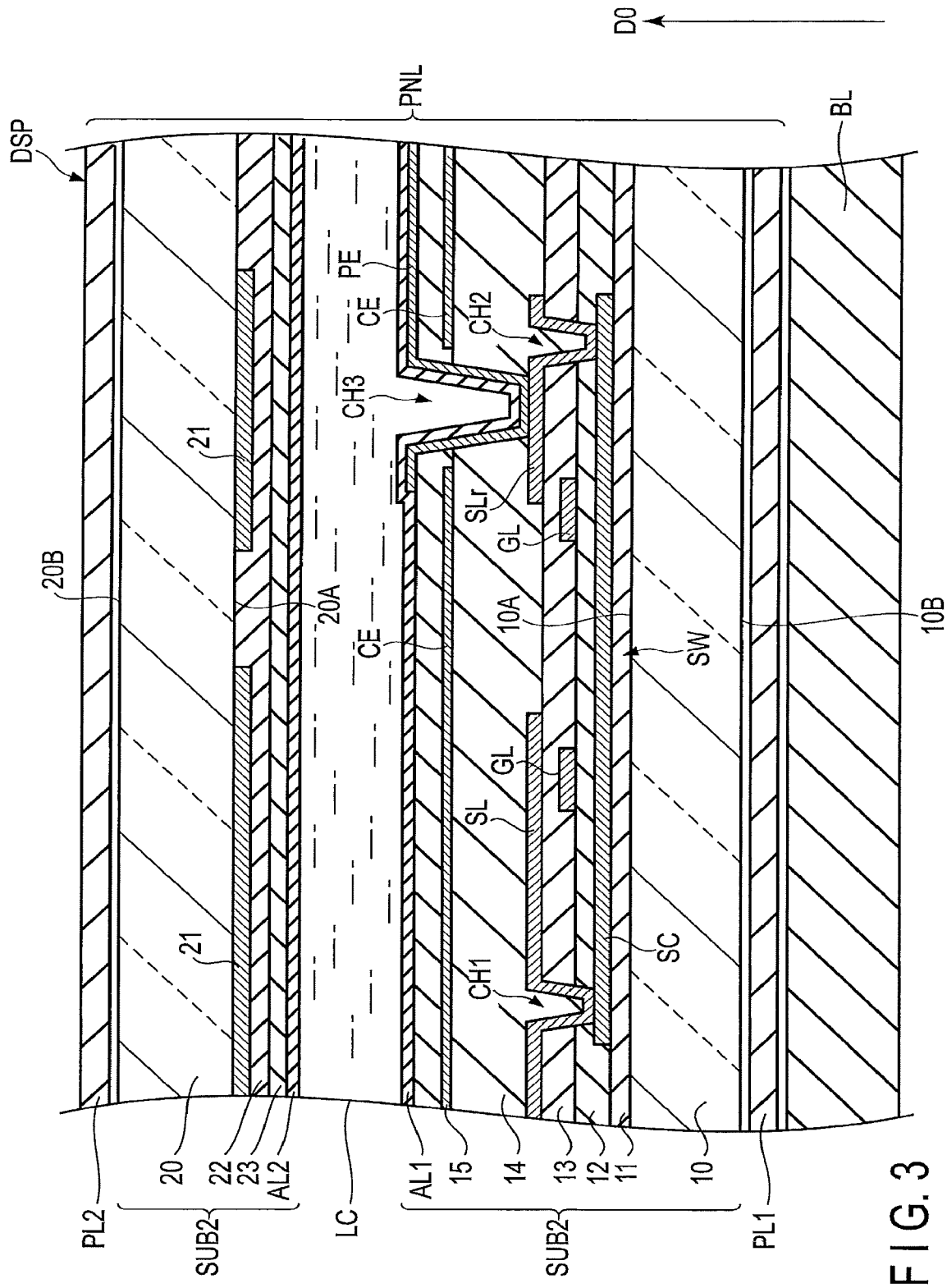
FIG. 3 is a cross-sectional view, taken along line F3-F3 of FIG. 2.

FIG. 3 is a cross-sectional view of the display device DSP, taken along line F3-F3 of FIG. 2. In the example of FIG. 3, the display panel PNL has the structure corresponding to a display mode which mainly uses a transverse field substantially parallel to the display surface. Note that the display panel PNL may have the structure corresponding to a display mode which uses a field vertical with respect to the display surface, or a field diagonal with respect to the display surface, or a combination of these fields.

As described above, the first substrate SUB1 includes the scan signal line GL, video signal line SL, switching element SW, pixel electrode PE, and common electrode CE. In addition thereto, the first substrate SUB1 includes, as shown in FIG. 3, a first flexible substrate 10, first insulating layer 11, second insulating layer 12, third insulating layer 13, fourth insulating layer 14, fifth insulating layer 15, and first alignment film AL1.

The first flexible substrate 10 is, for example, formed of a polyimide resin and is flexible, transmissive, and insulative. The first flexible substrate 10 includes a first surface 10A opposed to the second flexible substrate 20 and a second surface 10B in the opposite side to the first surface 10A. The first insulating layer 11 covers the first surface 10A of the first flexible substrate 10.

The semiconductor layer SC is formed on the first insulating layer 11. The second insulating layer 12 covers the first insulating layer 11 and the semiconductor layer SC. The scan signal line GL is formed on the second insulating layer 12. The third insulating layer 13 covers the second insulating layer 12 and the scan signal line GL.

The video signal line SL and the relay electrode SLr are formed on the third insulating layer 13. The video signal line SL and the relay electrode SLr are formed in a single process. The fourth insulating layer 14 covers the third insulating layer 13, video signal line SL, and relay electrode SLr. The common electrode CE is formed on the fourth insulating layer 14. The fifth insulating layer 15 covers the fourth insulating layer 14 and the common electrode CE.

The pixel electrode PE is formed on the fifth insulating layer 15. Note that the pixel electrode PE may be formed below the fifth insulating layer 15, and the common electrode CE may be formed above the fifth insulating layer 15. The fifth insulating layer 15 is an example of an interlayer insulating layer which insulates the pixel electrode PE and the common electrode CE. The first alignment film AL1 covers the fifth insulating layer 15 and the pixel electrode PE.

The scan signal line GL and the video signal line SL are formed of, for example, a metal material of single-layered structure or of layered structure. The video signal line SL may be thinner than the scan signal line GL. The relay electrode SLr is formed of the same metal material used for the video signal line SL, for example. The semiconductor layer SC is formed of a low or high temperature polysilicon (LTPS or HTPS). The pixel electrode PE and the common electrode CE are transparent conductive films formed of indium tin oxide (ITO) or indium zinc oxide (IZO).

The first to third and fifth insulating layers 11, 12, 13, and 15 are inorganic insulating layers formed of silicon oxide, silicon nitride, alumina, or the like. The fourth insulating layer 14 is an organic insulating layer formed of a photosensitive resin such as acrylic resin. The fourth insulating layer 14 has a function to flatten the unevenness of the switching element SW, and is formed to be thicker than the first to third and fifth insulating layers 11, 12, 13, and 15 and the first alignment film AL1. The fourth insulating layer 14 may be referred to as an organic flattening film.

The first and second contact holes CH1 and CH2 pass through the second and third insulating layers 12 and 13. The video signal line SL contacts the semiconductor layer SC through the first contact hole CH1. The relay electrode SLr contacts the semiconductor layer SC through the second contact hole CH2. One of the video signal line SL and the relay electrode SLr is a source electrode and the other thereof is a drain electrode.

The third contact hole CH3 passes the fourth and fifth insulating layers 14 and 15. The pixel electrode PE contacts the relay electrode SLr through the third contact hole CH3 and is electrically connected to the semiconductor layer SC. The third contact hole CH3 is an example of the contact hole through which the pixel electrode PE and the transistor (switching element SW) are electrically connected.

The second substrate SUB2 includes, in addition to the light shielding layer 21, the second flexible substrate 20, color filter layer 22, overcoat layer 23, and second alignment film AL2. The second flexible substrate 20 is formed of the same resin material used for the first flexible substrate 10. The second flexible substrate 20 includes a third surface 20A opposed to the first surface 10A of the first flexible substrate 10 and a fourth surface 20B which is in the opposite side of the third surface 20A.

The light shielding layer 21 is formed in the third surface 20A of the second flexible substrate 20 and covers the non-display area NDA shown in FIG. 1 in a plan view. The color filter layer 22 covers the third surface 20A and the light shielding layer 21. The color filter layer 22 includes colors corresponding to the subpixels SPX. The overcoat layer 23 covers the color filter layer 22. The second alignment film AL2 covers the overcoat layer 23.

The liquid crystal layer LC is disposed between the first and second alignment films AL1 and AL2. The first and second alignment films AL1 and AL2 align liquid crystal molecules of the liquid crystal layer LC while no voltage is applied to the pixel electrode PE. The first and second alignment films AL1 and AL2 are formed of a polyimide resin or the like applied by, for example, ink jet printing or flexography.

On the second surface 10B of the first flexible substrate 10, a first polarizer PL1 is adhered. On the fourth surface 20B of the second flexible substrate 20, a second polarizer PL2 is adhered. Note that, if the illumination device BL which irradiates polarized light is used, the first polarizer PL1 may be omitted.

The first and second polarizer PL1 and PL2 are examples of optical films adhered to the second surface 10B of the first flexible substrate 10 and the fourth surface 20B of the second flexible substrate 20. Note that the optical film is not limited to a polarizer which selectively passes desired polarized light of the incident light. As different examples of the optical films, there are a phase differential plate which compensates a phase difference of a circular polarizer and a light transmissive film which protects the display panel PNL.

Figure 4:
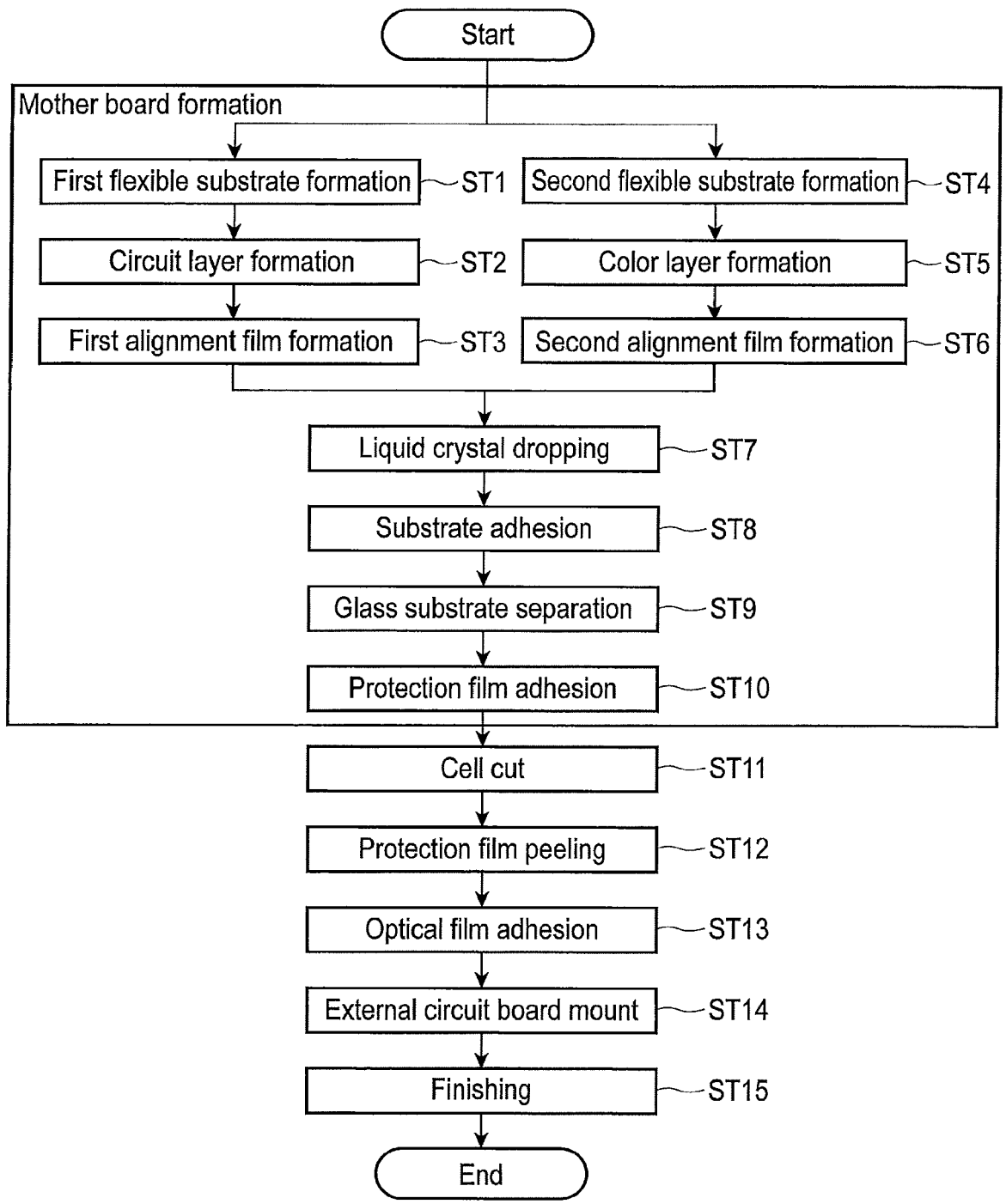
FIG. 4 is a flowchart of an example of a manufacturing method of the display device.

FIG. 4 is a flowchart of an example of a manufacturing method of the display device DSP. The manufacturing method of the display device DSP will be explained with reference to FIG. 4. A first substrate SUB1 is prepared through steps ST1 to ST3. A second substrate SUB2 is prepared through steps ST4 to ST6. A display panel PNL in which the first and second substrates SUB1 and SUB2 are aligned is prepared through steps ST7 to ST11. An optical film is adhered to the display panel PNL through steps ST12 and ST13. The display device DSP is formed through steps ST14 and ST15.

Steps ST1 to ST3 will be explained now. Initially, a material for the first flexible substrate 10 is applied on the upper surface of a rigid glass substrate, and the applied material is cured to form the first flexible substrate 10 (first flexible substrate formation ST1).

Photolithography or the like is repeatedly performed on the first flexible substrate 10 to form a circuit layer in which, for example, the scan signal line GL, scan driver GD, video signal line SL, video driver SD, switching element SW, common electrode CE, pixel electrode PE, first to fifth insulating layers 11, 12, 13, 14, and 15, and first spacer 31 are layered with high positional accuracy (circuit layer formation ST2).

A material of the first alignment film AL1 is applied on the circuit layer, and the applied material is cured to form the first alignment film AL1 (first alignment film formation ST3). A mother board including a plurality of first substrates SUB1 is obtained through steps ST1 to ST3.

Now, steps ST4 to ST6 will be explained. In a similar manner to step ST1, the second flexible substrate 20 is formed (second flexible substrate formation ST4). Photolithography or the like is repeatedly performed on the second flexible substrate 20 to form a color layer in which, for example, the light shielding layer 21, color filter layer 22, overcoat layer 23, and second spacer 32 are layered with high positional accuracy (color layer formation ST5). In a similar manner to step ST3, the second alignment film AL2 is formed (second alignment film formation ST6). Through steps ST4 to ST6, a mother board including a plurality of second substrates SUB2 is obtained.

Now, steps ST7 to ST11 will be explained. A sealant 3 is applied to one of the mother boards, and a liquid crystal material of the liquid crystal layer LC is dropped into the area surrounded by the sealant 3 (liquid crystal drop ST7). Two mother boards are aligned and adhered together, and the sealant 3 is cured (substrate adhesion ST8).

The glass substrate is separated from the second surface 10B of the first flexible substrate 10 (glass substrate separation ST9), and a protection film is adhered to the second surface 10B (protection film adhesion ST10). When laser is irradiated to the second surface 10B of the first flexible substrate 10 through the transmissive glass substrate, the first flexible substrate 10 absorbs the laser and slightly dissolves. Gaps are formed between the first flexible substrate 10 and the glass substrate, and thus, the glass substrate is separated from the first flexible substrate 10.

In a similar manner, the glass substrate is separated from the fourth surface 20B of the second flexible substrate 20, and a protection film is adhered to the fourth surface 20B. The protection film is a film formed of a polyethylene terephthalate resin or the like. The mother boar with the protection film is cut into a plurality of panels (cell cut ST11).

Now, steps ST12 to ST15 will be explained. The protection film is peeled off from the fourth surface 20B of the second flexible substrate 20 (protection film peeling ST12), and the second polarizer PL2 is adhered (optical film adhesion ST13). Similarly, the protection film is peeled off from the second surface 10B of the first flexible substrate 10, and the first polarizer PL1 is adhered.

An external circuit board is mounted in the terminal area NDAt (external circuit board mount ST14). Note that, after the external circuit board is mounted, the protection film may be peeled off and the first polarizer PL1 may be adhered (protection film peeling ST12 and optical film adhesion ST13). By attaching the illumination device BL to the display panel PNL, the display device DSP is formed (finishing ST15). Note that, after step ST 15, a process of curving the edges of the display device DSP may be added.

FIG. 5 is a plan view of an example of step ST13 of FIG. 4. In step ST13, a film such as the first polarizer PL1 or the second polarizer PL2 is pressed by a roller 45 and adhered to the first substrate SUB1 or the second substrate SUB2 to release bubbles or the like therebetween.

For example, as shown in FIG. 5, when the roller 45 pressing the first substrate SUB1 moves from the first side E1 to the third side E3, the liquid crystal material of the liquid crystal layer LC sealed between the first and second substrates SUB1 and SUB2 is pushed from the first side E1 to the third side E3. When the roller 45 moves rapidly, the liquid crystal material moves rapidly, and the sealant surrounding the liquid crystal layer LC may be damaged.

The roller 45 moves in arbitrary directions depending on the size of the roller 45, the size and aspect ratio of the display panel PNL, and the order of the film adhesion process. In the example of FIG. 5, the roller 45 moves in the long side direction of the display panel PNL; however, the roller 45 moves in the short side direction of the display panel PNL. That is, the liquid crystal material of the liquid crystal layer LC may move in both the first and second directions D1 and D2.

First Embodiment

Now, the display device DSP of the first embodiment will be explained with reference to FIGS. 2 and 6A to 8B. The display device DSP of the first embodiment includes a first protrusion 51 which ease the momentum of the liquid crystal material pushed toward the sealant 3.

Figure 6A:
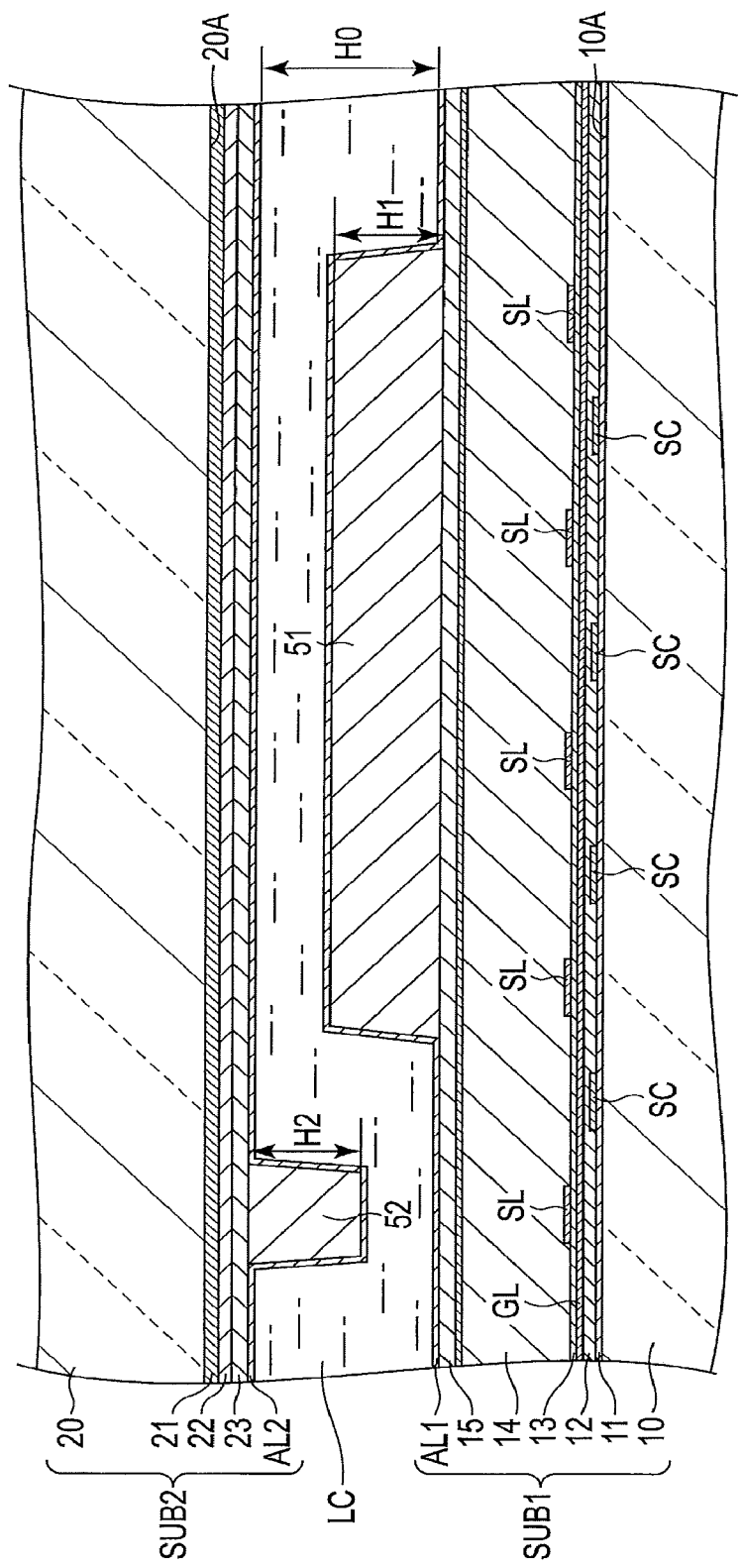
FIG. 6A is a cross-sectional view of the display device of a first embodiment, taken along line F6-F6 of FIG. 2.

The first protrusion 51 is disposed in the first surface 10A of the first flexible substrate 10A or the third surface 20A of the second flexible substrate 20. FIG. 6A is a cross-sectional view of the display device DSP of the first embodiment, taken along line F6-F6 of FIG. 2, in which the first protrusion 51 is disposed in the first surface 10A of the first flexible substrate 10. Note that the first protrusion 51 may be disposed in the third surface 20A of the second flexible substrate 20.

As shown in FIG. 6A, the scan signal line GL, video signal line SL, switching element SW, common electrode CE, pixel electrode PE, first to fifth insulating layers 11, 12, 13, 14, and 15, and the like may be interposed between the first surface 10A and the first protrusion 51 of the first flexible substrate 10. Although this is not shown, the light shielding layer 21, color filter layer 22, overcoat layer 23, and the like may be interposed between the third surface 20A and the first protrusion 51 of the second flexible substrate 20.

The display device DSP may further include a second protrusion 52. The second protrusion 52 is disposed in the first surface 10A or the third surface 20A where the first protrusion 51 is not disposed, and has a shape and a function similar to the first protrusion 51. In the example of FIG. 6A, the first protrusion 51 is disposed in the first surface 10A of the first flexible substrate 10, and the second protrusion 52 is disposed in the third surface 20A of the second flexible substrate 20.

Between the first and third surfaces 10A and 20A and the second protrusion 52, as with the first protrusion 51, the scan signal line GL, video signal line SL, switching element SW, common electrode CE, pixel electrode PE, first to fifth insulating layers 11, 12, 13, 14, and 15, light shielding layer 21, color filter layer 22, overcoat layer 23, and the like may be interposed.

As shown in FIG. 6A, the first protrusion 51 disposed in the first surface 10A has a gap with the second substrate SUB2. Note that, a gap is formed between the first protrusion 51 and the first substrate SUB1 even if the first protrusion 51 is disposed in the third surface 20A. The height H1 of the first protrusion 51 is, preferably, greater than a half of the value of the thickness H0 of the liquid crystal layer LC.

As shown in FIG. 2, the first protrusion 51 is disposed to overlap the light shielding layer 21 formed in the display area DA in a plan view. In the example of FIG. 2, the first protrusion 51 extends in the first direction D1 along the scan signal line GL and overlaps a part of the pixel electrode PE and the third contact hole CH3. Note that the first protrusion 51 extends parallel to the video signal line SL. As will be described later, the first protrusion 51 requires a height sufficient with respect to the liquid crystal layer LC. However, the light shielding layer 21 overlapping the scan signal line GL is wide enough to fully cover the first protrusion 51.

The first protrusion 51 is, for example, a photosensitive acrylic resin, and thus, has a low adhesion to the fifth insulating layer 15 which is an inorganic insulating layer. In the example of FIG. 2, at least a part of the material used for the first protrusion 51 contacts the upper surface of the pixel electrode PE as a transparent conductive film such as ITO which is highly adhesive to the first protrusion 51 as compared to the fifth insulating layer 15. Note that a first spacer 31 may contact the transparent conductive film which is not electrically connected to the pixel electrode. Furthermore, at least a part of the material used for the first protrusion 51 is positioned inside the third contact hole CH3 covered with the transparent conductive film which is the pixel electrode PE or the like. The material used for the first spacer 31 positioned inside the third contact hole CH3 protects the transparent conductive film.

Note that, in a structure where the pixel electrode PE is formed below the fifth insulating layer 15 and the common electrode CE is formed above the fifth insulating layer 15, at least a part of the material used for the first protrusion 51 contacts the upper surface of the common electrode CE which is a transparent conductive film. In a plan view, when a part of the bottom surface of the first protrusion 51 overlaps with the transparent conductive film, the first protrusion 51 can be tightly adhered to the first substrate SUB1.

The second protrusion 52 is formed of the resin material used for the first protrusion 51, and is highly adhesive to the layers such as light shielding layer 21, color filter layer 22, and overcoat layer 23 interposed between the second flexible substrate 20 and the second protrusion 52. As with the first protrusion 51, the second protrusion 52 includes a gap with the other substrate (first substrate SUB1).

As shown in FIG. 6A, the height H2 of the second protrusion 52 is, preferably, greater than a half the value of the thickness H0 of the liquid crystal layer LC. In the example of FIG. 6A, the first and second protrusions 51 and 52 are not opposed to each other or overlapped with each other in a plan view. Thus, the heights H1 and H2 of the first and second protrusions 51 and 52 can be secured sufficiently.

In the example of FIG. 2, the second protrusion 52 is disposed to overlap the light shielding layer 21 formed in the display area DA in a plan view and extends parallel to the video signal line SL. Note that the second protrusion 52 may extend parallel to the scan signal line GL. In the example of FIG. 2, the second protrusion 52 bends in a position to overlap the bending part SLz of the video signal line SL; however, the second protrusion 52 may be formed not to overlap the bending part SLz.

As described above, the light shielding layer 21 formed along the video signal line SL is narrower than the light shielding layer 21 formed along the scan signal line GL. When the second protrusion 52 is bent to overlap the bending part SLz, the second protrusion 52 may be widened and shifted out the light shielding layer 21. If the light shielding layer 21 is widened to match the second protrusion 52, the aperture AP is decreased and the screen is dimmed. If the second protrusion 52 is formed not to overlap the bending part SLz, the second protrusion 52 is not widened, and the light shielding layer 21 is not necessary to be widened.

Figure 6B:
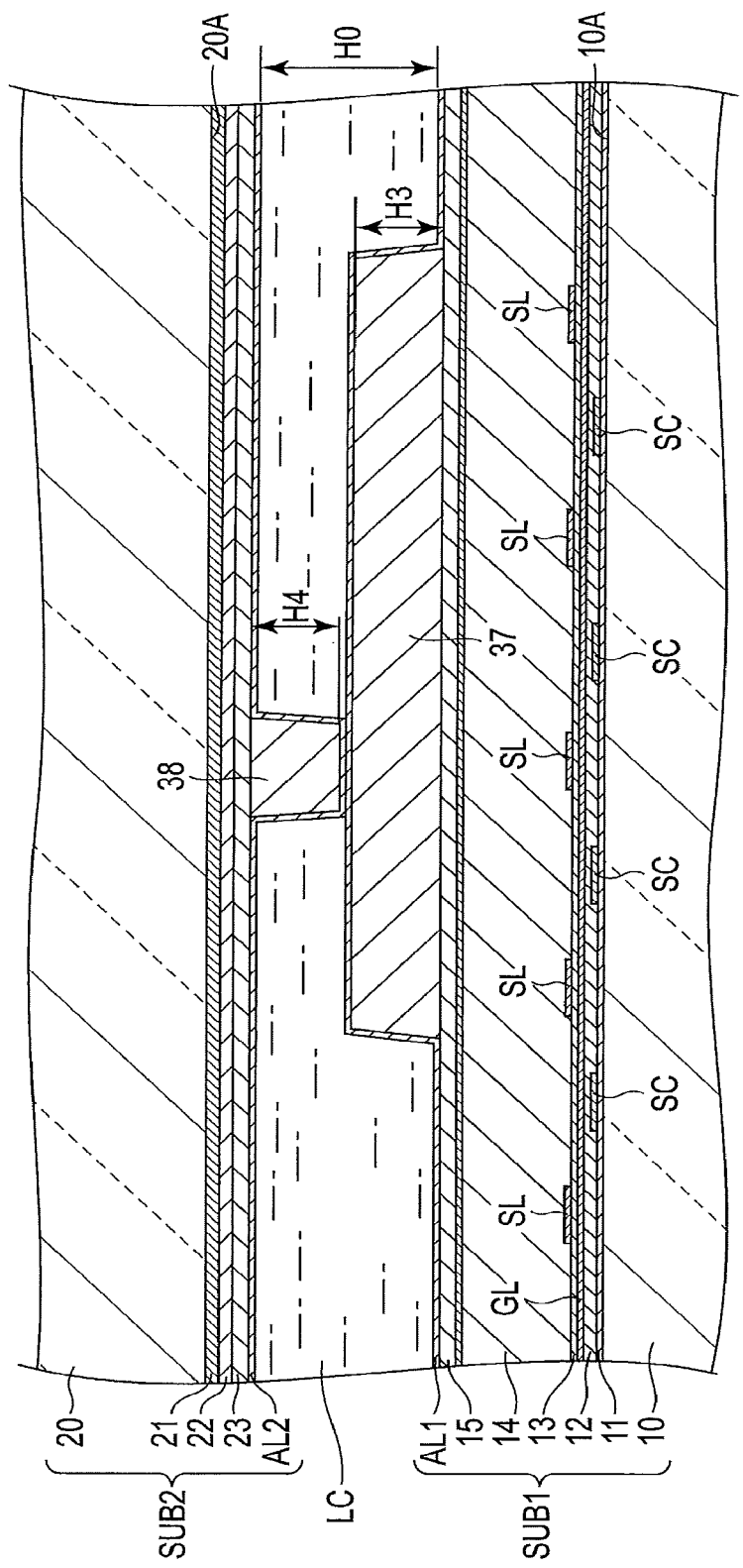
FIG. 6B is a cross-sectional view of third and fourth spacers of a variation of the display device of FIG. 6A.

FIG. 6B is a cross-sectional view of another example of the display device DSP of the first embodiment of FIG. 6A. In the variation of FIG. 6B, third and fourth spacers 37 and 38 are adopted instead of the first and second protrusions 51 and 52. The third and fourth spacers 37 and 38 contact with each other in contact parts 37X and 38X and define the thickness H0 of the liquid crystal layer LC. The third and fourth spacers 37 and 38 have heights H3 and H4 which are, for example, substantially half the value of the thickness H0 of the liquid crystal layer LC.

The third spacer 37 is, as with the first protrusion 51, disposed in the first surface 10A of the first flexible substrate 10 and extends in the first direction D1. The fourth spacer 38 is, as with the second protrusion 52, disposed in the third surface 20A of the second flexible substrate 10 and extends in the second direction D2. With the third and fourth spacers 37 and 38, the momentum of the liquid crystal material pushed toward the sealant 3 can be eased as with the first and second protrusions 51 and 52.

Figure 7:
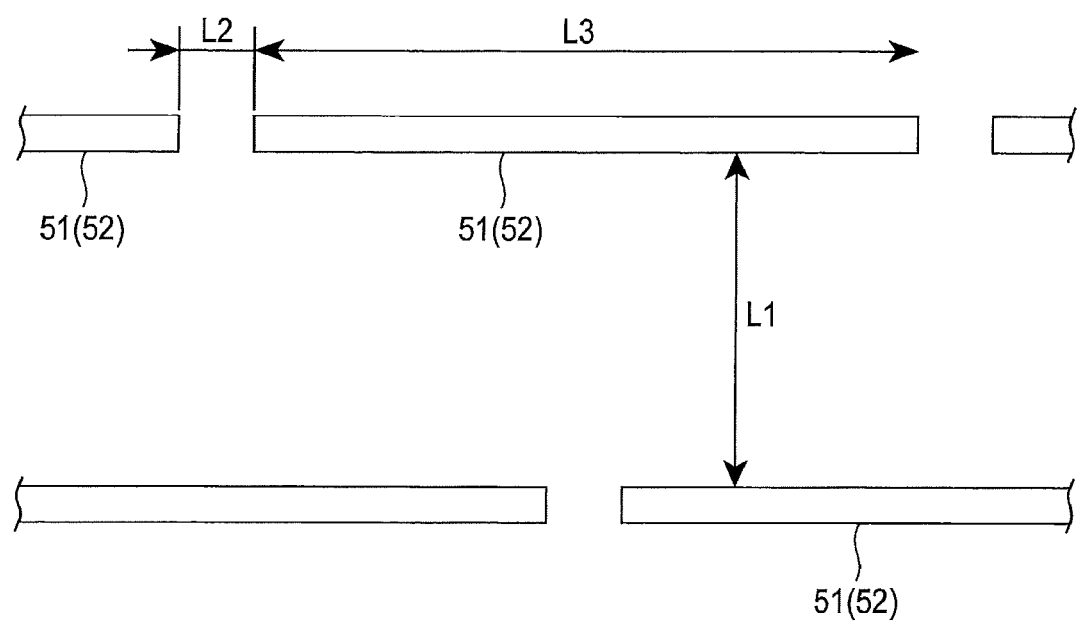
FIG. 7 is a plan view showing a gap between first protrusions adjacent to each other.

FIG. 7 is a plan view showing a gap between adjacent protrusions 51 and a gap between adjacent second protrusions 52. As shown in FIG. 7, a gap in a direction crossing the extension direction of adjacent first protrusions 51 is given L1, and a gap between adjacent first protrusions 51 in the extension direction thereof is given L2. A length L3 of each of the first and second protrusions 51 and 52 is given L3. Note that the gap between adjacent second protrusions 52 has a substantially the same relationship with the gap between adjacent first protrusions 51. Thus, the first protrusions 51 are described here and the description of the second protrusions 52 will be omitted if considered redundant.

In the adjacent first protrusions 51, the gap L in the direction crossing the extension direction of adjacent first protrusions 51 is, preferably, set to 1 mm or less. If the gap L1 is less than 1 mm, the material of the first alignment film AL1 becomes difficult to be evenly applied in step ST3, and thus, the thickness of the first alignment film AL1 may become uneven.

Furthermore, in the adjacent first protrusions 51, the gap L2 is, preferably, formed in the direction in which the first protrusion 51 extends. The gap L2 may be narrower than a width L0 of the subpixel SPX (shown in FIG. 2). If the gap L2 is not formed, the material of the first alignment film AL1 may not be spread on the first substrate SUB1 evenly, and the thickness of the first alignment film AL1 may become uneven. In the extension direction of the first protrusion 51, the length L3 of the first protrusion 51 is, for example, between 2.5 and 6 times the width L0 of the subpixel SPX.

In the example of FIG. 5 where the liquid crystal material moves along the second direction D2, the first protrusions 51 are arranged in the first direction D1 with gaps L2. Gaps L2 are arranged to be shifted from each other in the first direction D1 such that the gaps L2 in one line do not overlap with the gaps L2 in the first protrusions 51 in the next line.

FIG. 8A is a plan view schematically showing the arrangement density of the first and second protrusions 51 and 52. In step ST13, when the roller 45 moves from the first side E1 to the third side E3, the momentum of the liquid crystal material of the liquid crystal layer LC increases toward the third side E3. To prevent damage to the sealant 3, the arrangement density of the first and second protrusions 51 and 52 is, preferably, set higher in the center LCin of the liquid crystal layer LC than is in the periphery LCout of the liquid crystal layer LC as shown in FIG. 8A.

In other words, the gal L1 between adjacent first protrusions 51 is narrower in the periphery LCout of the liquid crystal layer LC than is in the center LCin of the liquid crystal layer LC. Similarly, the gap L1 between adjacent second protrusions 52 is narrower in the periphery LCout of the liquid crystal layer LC than is in the center LCin of the liquid crystal layer LC. With the first and second flexible substrates 10 and 20, the edges of the display device DSP may be bent. If the first and second protrusions 51 and 52 are arranged such that the arrangement density thereof becomes higher in the periphery LCout of the liquid crystal layer LC, the movement of the liquid crystal material in the proximity of the bending ends can be limited. Thus, even if the ends are bent, a cell gap of the liquid crystal layer LC is prevented from changing by a bias of the liquid crystal material.

Figure 8B:
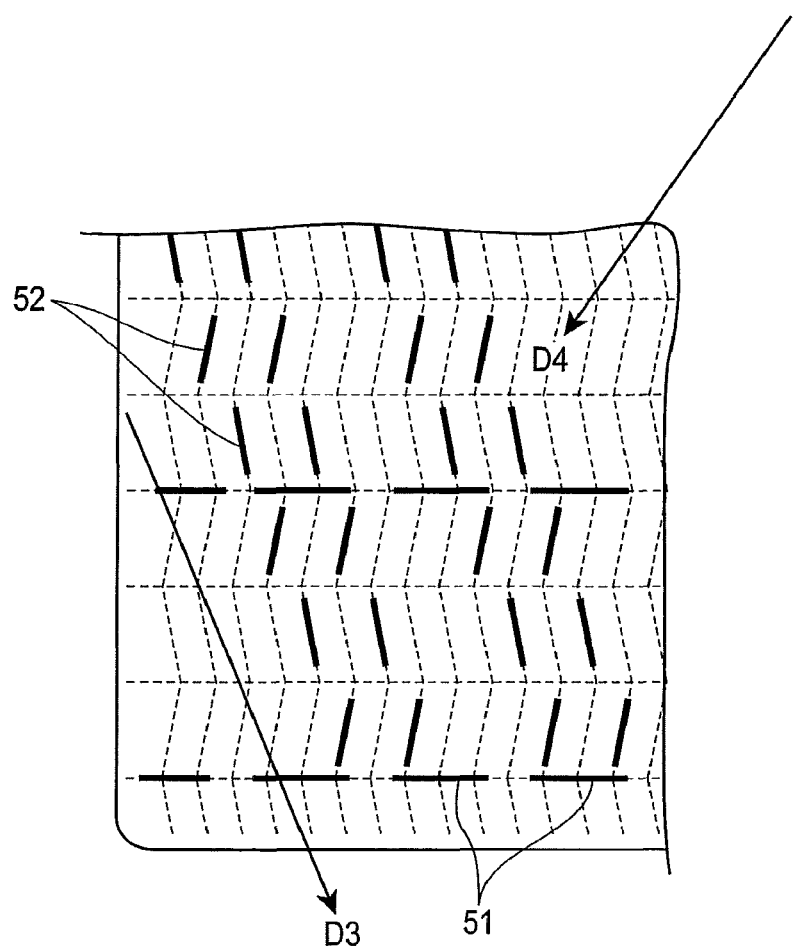
FIG. 8B is a plan view schematically showing another example of arrangement density of FIG. 8A.

FIG. 8B is a plan view of another example of the arrangement density of FIG. 8A. For example, if there is a step of attaching the display device DSP to a cover member such as a cover glass after step ST15 of FIG. 4, the liquid crystal material may move not only in the first and second directions D1 and D2 but also in a diagonal direction D4. If the first protrusions 51 are arranged in a crossing direction D3 crossing the diagonal direction D4 as in the example of FIG. 8B, the movement of the liquid crystal material in the diagonal direction D4 can be suppressed.

The display device DSP of the first embodiment includes the first and second protrusions 51 and 52 which ease the momentum of the liquid crystal material pushed toward the sealant 3. In the first embodiment, damage to the sealant 3 can be prevented in step ST13.

In step ST13, the liquid crystal material pushed by the roller 45 increases its momentum toward the sealant 3. The first and second protrusions 51 and 52 are arranged such that the arrangement density thereof increases in the periphery LCout of the liquid crystal layer LC than is in the center LCin thereof, and thus, the movement of the liquid crystal material can be suppressed effectively.

If there is not a gap at all between a protrusion and a substrate, an excessive force may be applied to a single protrusion and the protrusion may be damaged. The display device DSP includes a gap between the first protrusion 51 and the second substrate SUB2 and a gap between the second protrusion 52 and the first substrate SUB1. In the first embodiment, pressure can be dispersed by the first protrusions 51 and the second protrusions 52 to prevent the damage to the first and second protrusions 51 and 52.

Now, a display device DSP of each of second and third embodiments will be explained with reference to FIGS. 9 to 12. Note that, same or similar structures as in the first embodiment are referred to by the same reference numbers in the following description, and explanation considered redundant will be omitted. The other structures are the same as in the first embodiment.

Second Embodiment

FIG. 9 is a cross-sectional view of a non-display area NDA of the display device DSP of the second embodiment. The second embodiment includes a third protrusion 53 disposed in the interface of the sealant 3 and the liquid crystal layer LC and differs from the first embodiment in this respect.

The third protrusion 53 may be disposed in the first surface 10A of the first flexible substrate 10, or in the third surface 20A of the second flexible substrate 20, or in both. Furthermore, the scan signal line GL, scan driver GD, video signal line SL, video driver SD, transparent conductive film, firs to fifth insulating layers 11, 12, 13, 14, and 15, and the like are interposed between the third protrusion 53 and the first surface 10A, or the light shielding layer 21, color filter layer 22, overcoat layer 23, and the like may be interposed between the third protrusion 53 and the third surface 20A. In the example of FIG. 9, the third protrusion 53 is disposed in the third surface 20A of the second flexible substrate 20 above the overcoat layer 23.

The third protrusion 53 is disposed in the interface of the sealant 3 and the liquid crystal layer LC, and at least a part of the third protrusion 53 overlaps the sealant 3 and the liquid crystal layer LC in a plan view. The fourth insulating layer 14 is formed with unevenness thereon to increase a contacting area with the sealant 3 and includes a convex 54. The third protrusion 53 forms a narrow path 55 with the convex 54.

In the second embodiment, the sealant 3 is not exposed to the liquid crystal layer LC except for the narrow path 55, and thus, is not easily effected by the liquid crystal layer LC. In the second embodiment, the third protrusion 53 is disposed in the non-display area NDA in addition to the first and second protrusions 51 and 52 arranged in the display area DA, and the sealant 3 can be protected more effectively from the liquid crystal material pushed thereto.

Third Embodiment

Now, the third embodiment will be explained with reference to FIGS. 10 to 12. The third embodiment includes a stopper 30 which suppress positional shifting of the second substrate SUB2 with respect to the first substrate SUB1 and differs from the first embodiment in this respect.

Figure 10:
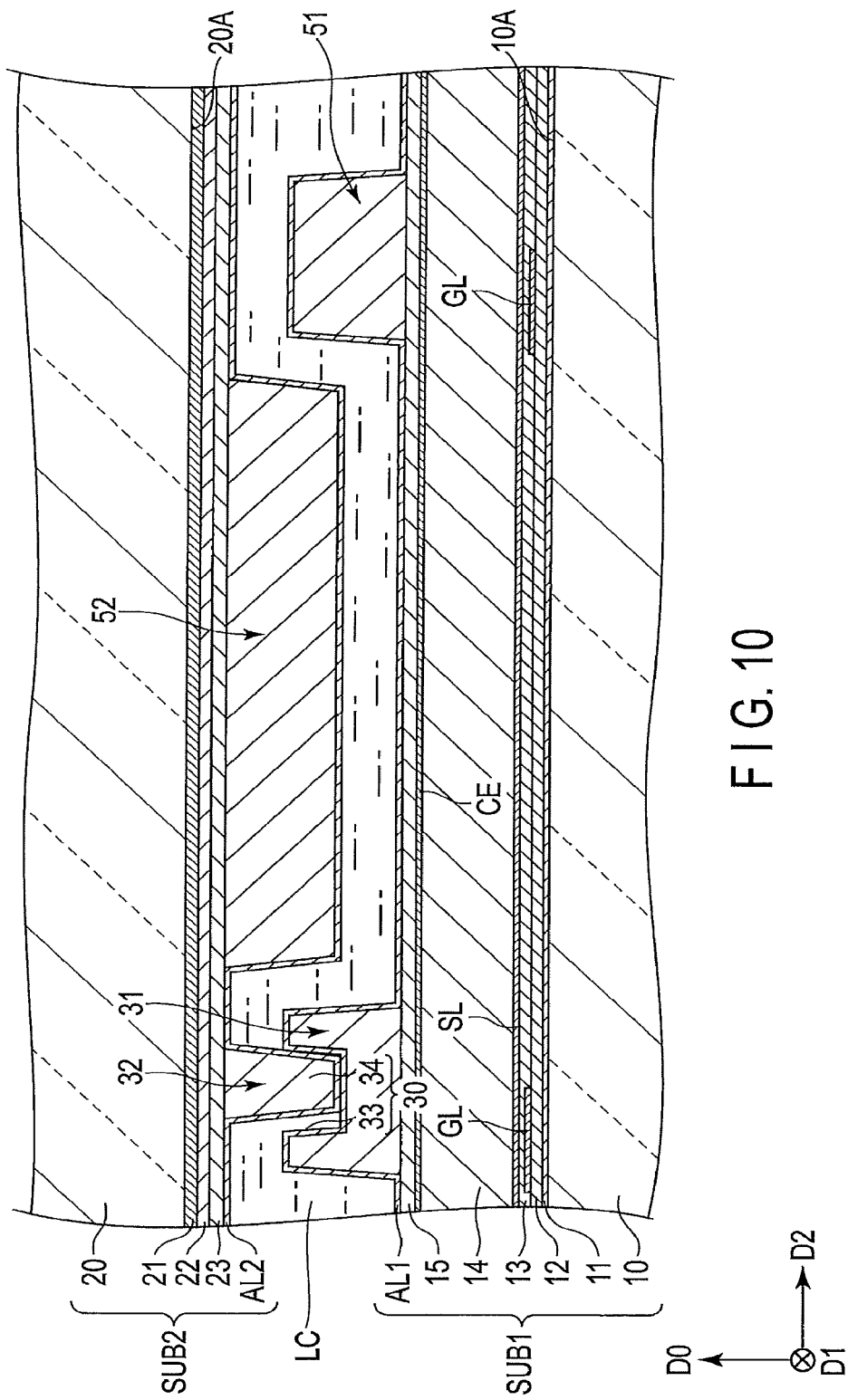
FIG. 10 is a cross-sectional view of a stopper of a display device of a third embodiment.

FIG. 10 is a cross-sectional view of the stopper 30 of the display device of the third embodiment. As in FIG. 10, the display device DSP of the third embodiment further includes a first spacer 31 disposed in the first surface 10A of the first flexible substrate 10 and the second spacer 32 disposed in the third surface 20A of the second flexible substrate 20.

Note that, as shown in FIG. 10, the scan signal line GL, video signal line SL, switching element SW, common electrode CE, pixel electrode PE, first to fifth insulating layers 11, 12, 13, 14, and 15, and the like may be interposed between the first surface 10A and the first spacer 31 of the first flexible substrate 10. Similarly, the light shielding layer 21, color filter layer 22, overcoat layer 23, and the like may be interposed between the third surface 20A and the second spacer 32 of the second flexible substrate 20.

One of the first and second spacers 31 and 32 includes a concave 33 and the other includes a convex 34. FIG. 10 shows an example where the first spacer 31 includes the concave 33 and the second spacer 32 includes the convex 34. The tip of the convex 34 contacts the concave 33 and prevents the movement of the second substrate SUB2. Although this is not shown, the first spacer 31 may include the convex 34 and the second spacer 32 may include the concave 33. The concave 33 and the convex 34 form the stopper 30 which suppresses positional shifting of the first and second substrates SUB1 and SUB2.

FIG. 11 is a plan view showing the stopper 30 of FIG. 10 in an enlarged manner. As shown in FIG. 11, the first and second spacers 31 and 32 overlap the light shielding layer 21 in a plan view. In the example of FIG. 11, the first spacer 31 extends in the first direction D1 along the scan signal line GL as in the first protrusion 51.

Note that the first spacer 31 may extend parallel to the video signal line SL. The length of the first spacer 31 is slightly less than that of the first protrusion 51 and is two to three times as the width L0 of the subpixel SPX, for example. The first and second spacers 31 and 32 are formed of the resin material used for the first and second protrusions 51 and 52.

As with the first protrusion 51, at least a part of the material used for the first spacer 31 contacts the upper surface of the pixel electrode PE as a transparent conductive film and the inside of the third contact hole CH3. As with the second protrusion 52, the second spacer 32 is highly adhesive to layers including the light shielding layer 21, color filter layer 22, overcoat layer 23, and the like interposed between the second flexible substrate 20 and the second protrusion 52.

In step ST12, the protection film is peeled off from the first and second flexible substrates 10 and 20 along the diagonal direction (peeling direction) D4 crossing the first and second directions D1 and D2 (the long side direction and the short side direction of the display panel PNL, for example). At that time, the second substrate SUB2 may be shifted from the first substrate SUB1 in the diagonal direction D4. The diagonal direction D4 is, for example, a direction along the diagonal of the first substrate SUB1 and the second substrate SUB2.

Furthermore, in step ST13, the substrate adhered to the film may be pulled by the moving roller 45 and the second substrate SUB2 may be shifted from the first substrate SUB1 in the first direction D1 or in the second direction D2.

Furthermore, as shown in FIG. 12, edges of the first to fourth display areas NDA1, NDA2, NDA3, and NDA4 of FIG. 1 may be curved. In that case, the second substrate SUB2 may be moved in the diagonal direction D4 with respect to the first substrate SUB1 in the proximity of the edges of the first to fourth display areas NDA1, NDA2, NDA3, and NDA4.

As shown in FIG. 11, the inner surfaces 33A, 33B, and 33C of the concave 34 extend in a thirty first direction D31 which substantially matches the crossing direction D3 orthogonal to the diagonal direction D4. The tip 34A of the convex 34 extends along the thirty second direction D32 which substantially matches the crossing direction D3.

In the third embodiment, if the second substrate SUB2 is pulled in the diagonal direction D4 with respect to the first substrate SUB1 by the protection film PR, the tip 34A of the convex 34 contacts the inner surface 33A or 33C of the concave 33 as shown in FIG. 11. The movement of the second substrate SUB2 in the diagonal direction D4 can be prevented by the stopper 30 formed of the concave 33 and the convex 34.

Furthermore, in step ST13 of FIG. 4, if the second substrate SUB2 is pulled by the roller 45 in the first direction D1 or the second direction D2, the tip 34A of the convex 34 contacts the inner surface 33A or the inner surface 33C of the concave 33 as shown in FIG. 11. The movement of the second substrate SUB2 in the first and second directions D1 and D2 can be prevented by the stopper 30 formed of the concave 33 and the convex 34.

In the third embodiment, the movement of the second substrate SUB2 with respect to the first substrate SUB1 can be prevented by the stopper 30 formed of the concave 33 and the convex 34, and positional shifting of the first and second substrates SUB1 and SUB2 can be prevented.

Furthermore, the first spacer 31 and the first protrusion 51 are formed of the same material on the same layer through the same process. The second spacer 32 and the second protrusion 52 are formed of the same material on the same layer through the same process. The stopper 30 can be formed together with the first and second protrusions 51 and 52, and thus, an additional step is not required to the steps of the first embodiment.

Note that an example where the second substrate SUB2 is moved with respect to the first substrate SUB1 is not limited to step ST13 of FIG. 5. For example, such positional shifting may occur in various steps including a step of bending two adjacent sides of the display device DSP, a suction step of the conveyed medium when the display device DSP is conveyed, the glass substrate separation ST9 of FIG. 4, and a heating step (autoclave) to remove bubbles in the first and second polarizers PL1 and PL2 adhered to the display device DSP. In the present embodiment, such positional shifting can be prevented by the first and second spacers 31 and 32.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A display device comprising:
   a first flexible substrate including a first surface and a second surface opposite to the first surface;
   a second flexible substrate including a third surface opposite to the first surface and a fourth surface opposite to the third surface;
   a sealant adhering the first surface and the third surface;
   a liquid crystal layer between the first surface and the third surface, the liquid crystal layer being located in an inner side of the sealant;
   a film on the fourth surface;
   a plurality of first protrusions on one of the first surface and the third surface;
   a plurality of scan signal lines extending in a first direction;

a plurality of video signal lines extending in a second direction crossing the first direction;
a plurality of switching elements arranged on the first flexible substrate; and
a plurality of pixel electrodes arranged on the first flexible substrate, wherein
the plurality of scan signal lines and the plurality of video signal lines are arranged on the first flexible substrate,
a color filter and a light shielding layer are arranged on the second flexible substrate,
the plurality of first protrusions overlap the scan signal lines and the light shielding layer, and extend in the first direction in a plan view,
each of the plurality of video signal lines are separated from each other by a first pitch,
each of the plurality of the first protrusions is located in the inner side of the sealant,
each of the plurality of the first protrusions has a length in the first direction,
the length of the first protrusions is longer than two of the first pitch,
each of the plurality of the first protrusions crosses at least three of the video signal lines,
each of the plurality of the first protrusions has a first height which is greater than a half of a thickness of the liquid crystal layer,
the plurality of the first protrusions do not contact the other of the first surface and the third surface against the first protrusions,
the plurality of the first protrusions are arranged in the first direction at intervals,
the plurality of the switching elements and the plurality of the pixel electrodes are connected through contact holes, respectively,
each of the plurality of the first protrusions overlaps at least three of the contact holes, and
a direction in which the first protrusions extend matches a short side direction of the first flexible substrate.

2. The display device of claim 1, further comprising a second protrusion on the other of the first surface and the third surface against the first protrusions, wherein
the second protrusion overlaps the video signal lines, and extends in the second direction in a plan view.

3. The display device of claim 1, wherein the plurality of the first protrusions are arranged in the first direction with first gaps therebetween and arranged in the second direction with second gaps therebetween,
each of the first protrusions has a shape extending in the first direction, and
the first gaps are smaller than the second gaps.

4. The display device of claim 3, further comprising a plurality of subpixels, wherein
the first gaps are narrower than a width of each of the subpixels.

5. The display device of claim 1, wherein an arrangement density of the first protrusions is greater in a periphery of the liquid crystal layer than is in a center thereof.

6. The display device of claim 2, wherein an arrangement density of the first protrusions is greater in a periphery of the liquid crystal layer than is in a center thereof.

7. The display device of claim 3, wherein an arrangement density of the first protrusions is greater in a periphery of the liquid crystal layer than is in a center thereof.

8. The display device of claim 1, further comprising:
a first spacer on the first surface; and
a second spacer on the third surface, wherein
one of the first spacer and the second spacer includes a concave and the other has a convex, and
a tip of the convex contacts the concave.

9. The display device of claim 8, wherein the first protrusions are on the first surface, and a length of a long side of the first protrusions are greater than a length of a long side of the first spacer.

10. The display device of claim 1, further comprising a third protrusion on the first surface and/or the second surface, wherein
at least a part of the third protrusion overlaps the sealant and the liquid crystal layer in a plan view.

11. The display device of claim 2, further comprising a third protrusion on the first surface and/or the second surface, wherein
at least a part of the third protrusion overlaps the sealant and the liquid crystal layer in a plan view.

* * * * *